(12) United States Patent
Jeong et al.

(10) Patent No.: US 10,605,961 B2
(45) Date of Patent: Mar. 31, 2020

(54) METHOD OF MANUFACTURING FLEXIBLE WINDOW AND FLEXIBLE DISPLAY DEVICE

(71) Applicant: SAMSUNG DISPLAY CO., LTD., Yongin-si, Gyeonggi-do (KR)

(72) Inventors: Yong Cheol Jeong, Yongin-si (KR); Seung Wook Nam, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 88 days.

(21) Appl. No.: 15/884,937

(22) Filed: Jan. 31, 2018

(65) Prior Publication Data

US 2018/0156945 A1    Jun. 7, 2018

Related U.S. Application Data

(62) Division of application No. 14/850,983, filed on Sep. 11, 2015.

(30) Foreign Application Priority Data

Jan. 15, 2015 (KR) .......................... 10-2015-0007620

(51) Int. Cl.
| | |
|---|---|
| *B32B 38/18* | (2006.01) |
| *G02B 1/14* | (2015.01) |
| *B32B 37/12* | (2006.01) |
| *B32B 38/00* | (2006.01) |

(52) U.S. Cl.
CPC ................ *G02B 1/14* (2015.01); *B32B 37/12* (2013.01); *B32B 38/1866* (2013.01); *B32B 2038/0076* (2013.01); *B32B 2310/0831* (2013.01); *B32B 2457/20* (2013.01)

(58) Field of Classification Search
CPC ........ B32B 37/12; B32B 38/1866; G02B 1/14
See application file for complete search history.

(56) References Cited

U.S. PATENT DOCUMENTS

| | | | |
|---|---|---|---|
| 2013/0034685 A1* | 2/2013 | An ..................... | H01L 51/524 428/121 |
| 2013/0083496 A1 | 4/2013 | Franklin et al. | |

FOREIGN PATENT DOCUMENTS

| | | | | |
|---|---|---|---|---|
| JP | 2000238074 A | * | 9/2000 | ............ B29C 39/12 |
| JP | 4201365 B2 | | 10/2008 | |
| JP | 2011-020406 A | | 2/2011 | |
| KR | 10-2013-0076402 A | | 7/2013 | |
| KR | 10-2014-0033546 A | | 3/2014 | |

OTHER PUBLICATIONS

Machine Translation of JP-2000238074-A (Year: 2000).*

* cited by examiner

*Primary Examiner* — Daniel McNally
(74) *Attorney, Agent, or Firm* — Kile Park Reed & Houtteman PLLC

(57) ABSTRACT

A flexible window for a display panel, the flexible window including a flexible transparent base film attachable to the display panel; and a hard coating layer attached to the transparent base film, the hard coating layer having a concave first side opposite the flexible transparent base film when the hard coating layer is separated from the display panel.

8 Claims, 9 Drawing Sheets

METHOD OF MANUFACTURING FLEXIBLE WINDOW AND FLEXIBLE DISPLAY DEVICE

CROSS-REFERENCE TO RELATED APPLICATIONS

This is a divisional application based on pending application Ser. No. 14/850,983, filed Sep. 11, 2015, the entire contents of which is hereby incorporated by reference.

Korean Patent Application No. 10-2015-0007620, filed on Jan. 15, 2015, in the Korean Intellectual Property Office, and entitled: "Flexible Window and Manufacturing Method Thereof and Flexible Display Thereof," is incorporated by reference herein in its entirety.

BACKGROUND

1. Field

Embodiments relate to a flexible window and a method of manufacturing the flexible window.

2. Description of the Related Art

High-quality displays such as an organic light emitting display panel, a liquid crystal display panel, plasma display panel, and an electrophoretic display panel may be used in displays.

SUMMARY

Embodiments may be realized by providing a flexible window for a display panel, the flexible window including a flexible transparent base film attachable to the display panel; and a hard coating layer attached to the transparent base film, the hard coating layer having a concave first side opposite the flexible transparent base film when the hard coating layer is separated from the display panel.

The hard coating layer may have a second side opposite to the concave first side, the second side having a same curvature as the concave first side.

The hard coating layer may include a composition for forming a ultraviolet-curable hard coating layer.

The flexible window may further include a first protective film attached to a second side of the hard coating layer, the second side being opposite the concave first side; and a second protective film attached to a side of the transparent base film opposite a side to which the hard coating layer is attached.

The first protective film may be thicker than the second protective film.

The hard coating layer may be flat when the flexible transparent base film is attached to the display panel.

A flexible display may include the flexible window; and the display panel to which the flexible transparent base film is attached.

Embodiments may be realized by providing a method of manufacturing a flexible window, the method including placing a transparent base film onto a curved jig having a rounded surface; applying uncured hard coating solution onto the transparent base film; and forming a hard coating layer by curing the hard coating solution with ultraviolet rays.

The method may further include attaching a first protective film onto a side of the hard coating layer opposite a side contacting the transparent base film; and attaching a second protective film onto a side of the transparent base film opposite a side to which the uncured hard coating solution is applied.

The first protective film may be thicker than the second protective film.

The curved jig may have a radius of curvature of 20 mm at the surface where the transparent base film is placed.

Embodiments may be realized by providing a flexible window, including a flexible transparent base film; a hard coating layer attached to the transparent base film; a first protective film attached to a side of the hard coating layer opposite a side contacting the transparent base film; and a second protective film attached to a side of the transparent base film opposite a side to which the hard coating layer is attached; the hard coating layer having a concave first side opposite the flexible transparent base film when the first protective film is separated from the hard coating layer and the second protective film is separated from the transparent base film.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
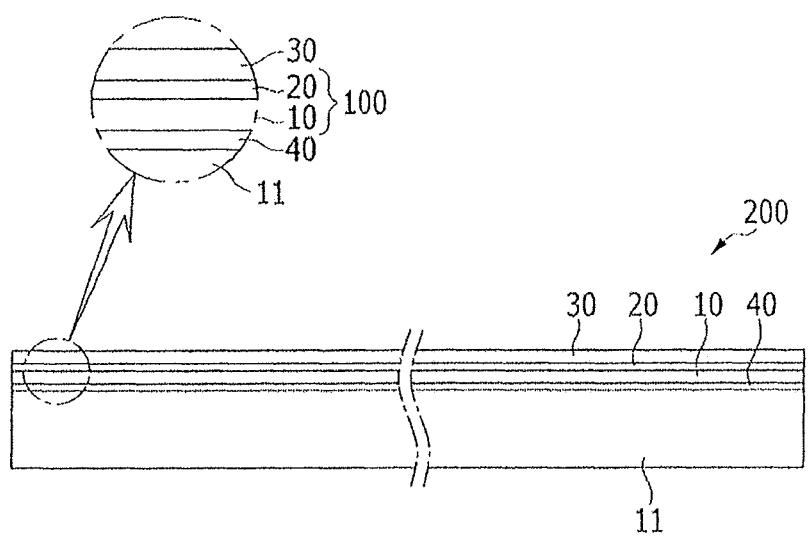
FIG. 1 illustrates a schematic side view of a flexible window according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a schematic side view of a flexible window according to an exemplary embodiment.

As illustrated in FIG. 1, a flexible window 100 according to an exemplary embodiment may include a flexible transparent base film 10 attached on a display panel unit 11, a hard coating layer 20 attached on the transparent base film 10, a first protective film 30 attached on the top of the hard coating layer 20, and a second protective film 40 attached on the bottom of the transparent base film 10.

The display panel unit 11 may be included in a flexible display 200, and in the exemplary embodiment an organic emission layer may be included. In an embodiment, the display panel unit 11 may include, for example, a liquid crystal display element or a plasma display element. The flexible window 100 including the transparent base film 10 and the hard coating layer 20 may be on the display panel unit 11.

The transparent base film 10 may be attached to a part of the display panel unit 11, where images may be displayed, and may be made of transparent plastic that may transmit images.

In an embodiment, the transparent base film 10 may be made of various flexible materials that may transmit images and deform. The hard coating layer 20 may be on the transparent base film 10.

The hard coating layer, which may protect the display panel unit 11, may be formed on the transparent base film 10 by applying hard coating solution 21 on the transparent base film 10 and then curing the hard coating solution 21 with ultraviolet rays.

Figure 2:
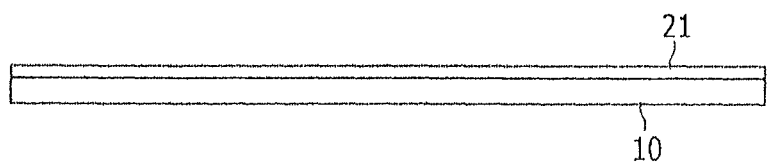
FIG. 2 illustrates a schematic side view of a transparent base film with hard coating solution applied thereon, in accordance with an exemplary embodiment.

FIG. 2 illustrates a schematic side view of a transparent base film with coating solution applied thereon, in accordance with an exemplary embodiment.

As illustrated in FIG. 2, the hard coating solution 21 may include a composition for forming UV-curable hard coating layer and may be formed into the hard coating layer 20 by UV-curing. A process of forming the hard coating layer 20 will be described hereafter in detail with reference to the drawings.

Figure 3:
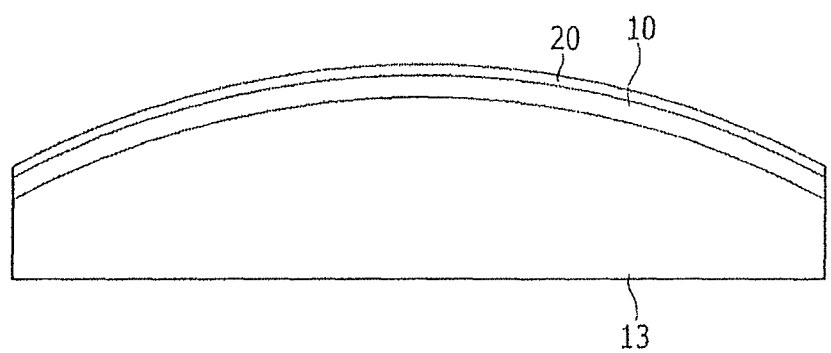
FIG. 3 illustrates a schematic side view of the transparent base film with the hard coating solution of FIG. 2 seated on a curved jig.
Figure 4:
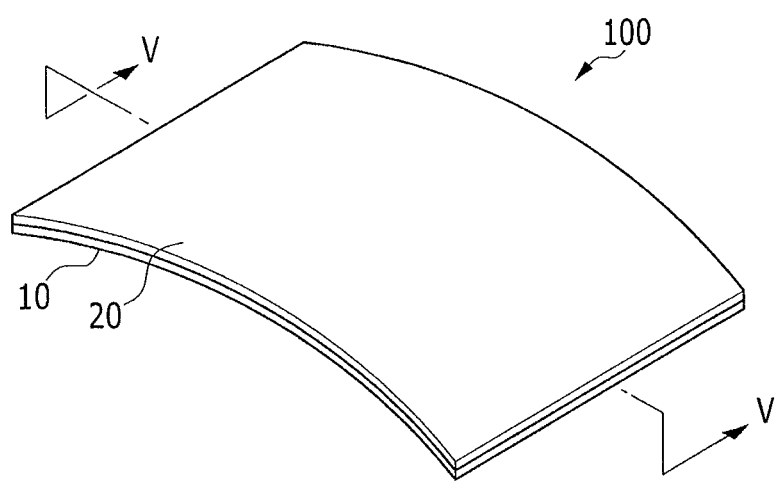
FIG. 4 illustrates a perspective view schematically of the hard coating solution of FIG. 2 that has been cured by ultraviolet (UV) rays on the curved jig.
Figure 5:
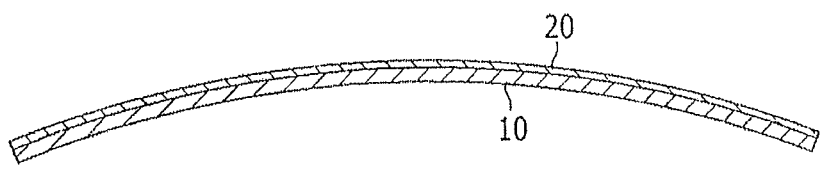
FIG. 5 illustrates a cross-sectional view taken along line V-V in FIG. 4.

FIG. 3 illustrates a schematic side view of the transparent base film with the hard coating solution of FIG. 2 seated on a curved jig, FIG. 4 illustrates a perspective view schematically of the hard coating solution of FIG. 2 that has been cured by ultraviolet rays on the curved jig, and FIG. 5 illustrates a cross-sectional view taken along line V-V in FIG. 4.

First, as illustrated in FIG. 2, the hard coating solution 21 may applied onto the transparent base film 10.

Next, as illustrated in FIG. 3, the transparent base film 10 with the hard coating layer 21 applied may be placed on a curved jig 13. The curved jig 13 may have a rounded surface where the transparent base film 10 may be placed.

The transparent base material 10 with the hard coating solution 21 applied thereon may be placed on the curved jig 13 to make a uniform curvature on, e.g., in, the hard coating layer 20 in the process of forming the hard coating layer 20 by curing the hard coating solution 21 with ultraviolet rays. The hard coating layer 20 may have a concave first side where the display panel unit 11 may be attached and a concave second side having the same curvature as the first side and opposite to the first side.

In the exemplary embodiment, the curvature R of the rounded surface of the curved jig 13 may be 20 mm. The curvature R of the curved jig 13 may be set to 20 mm to make the radius of curvature of the hard coating layer 20 of the flexible window 100 to be 20 mm. Accordingly, damage to the hard coating layer 20, such as cracks, may be prevented when the flexible display 200 is deformed for use and the display panel unit 11 is unfolded. This configuration is described in detail below.

Next, with the flexible window 100 on the curved jig 13, the hard coating solution 21 may be cured into the hard coating layer 20 by ultraviolet rays.

Next, as illustrated in FIGS. 4 and 5, the flexible window 100 may be separated from the curved jig 13 and may have a rounded shape with a reverse curvature R of 20 mm. The flexible window 100 may have a rounded shape with a radius of curvature of 20 mm in the exemplary embodiment. In an embodiment, the radius of curvature may be appropriately modified to fit to a change of the display panel unit 11 to a value not damaging the hard coating layer 20 of the flexible window 100 when deformed As the hard coating layer 20 may have a reverse rounded shape by the curved jig 13, the display panel unit 11 may not be damaged such as breaking while deformed.

The hard coating layer 20 may be made of a brittle material, having properties similar to those of ceramic, and the existing hard coating layers may break when the display panel unit 11 is unfolded. The hard coating layer 20 of the exemplary embodiment may have a reverse curvature R of 20, and when the flexible display 200 is unfolded and the display panel unit 11 is deformed outward, the reverse curvature may compensate for the deformation. The hard coating layer 20 may not be damaged, when the flexible display 200 is unfolded, and the lifespan of the flexible display may be increased.

The first protective film 30 and the second protective film 40 may be attached to both sides, respectively, of the flexible window 100.

Figure 6:
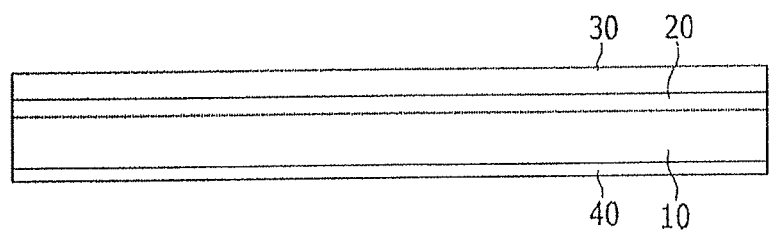
FIG. 6 illustrates a schematic side view of a first protective film and a second protective film attached on the hard coating layer and the transparent base film of FIG. 4.

FIG. 6 illustrates a schematic side view of a first protective film and a second protective film attached on the hard coating layer and the transparent base film of FIG. 4.

As illustrated in FIG. 6, the first protective film 30 may be attached on the top of the hard coating layer 20. The first protective film 30, which may cover the entire surface of the hard coating layer 20, may be made of a transparent material that may transmit images on the display panel unit 11.

The second protective film 40, which may be attached on the bottom of the transparent base film 10, may be made of the same material as the first protective film 30, and the transparent base film 10 with the hard coating layer 20 attached thereon may be protected against an external shock and surface damage by the first protective film 30 and the second protective film 40.

The first protective film 30 may be attached to the hard coating layer 20, and the first protective film 30 may be thicker than the second protective film 40. In the exemplary embodiment, the first protective film 30 may be twice or more thicker than the second protective film 40.

The first protective film 30 may be made thicker than the second protective film 40 to make the flexible window 100 flat when it is not attached to the display panel unit 11.

As illustrated in FIG. 6, the flexible window 100 may be flat, when it is not attached to the display panel unit 11. Making the flexible window 100 flat when it is not attached to the display panel unit 11 may be achieved by compensating for the reverse curvature of the hard coating layer 20 with the first protective film 30. The first protective film 30 may be thicker than the second protective film 40, and the first protective film 30 may apply a tensile force to the hard coating layer 20. The reverse curvature of the hard coating layer 20 may be compensated for by the tensile force applied by the first protective film 30, and the hard coating layer 20 may be flat when it is not attached to the display panel unit 11.

As described above, the flexible window 100 may be made flat by the first protective film 30 and the second protective film 40, when the flexible window 100 is not attached to the display panel unit 11. The hard coating layer 20 of the flexible window 100 may have a reverse curvature R of 20 mm, the curvature may be compensated for when the flexible window 100 is reversely curved, and breaking due to a shock may be prevented.

Figure 7:
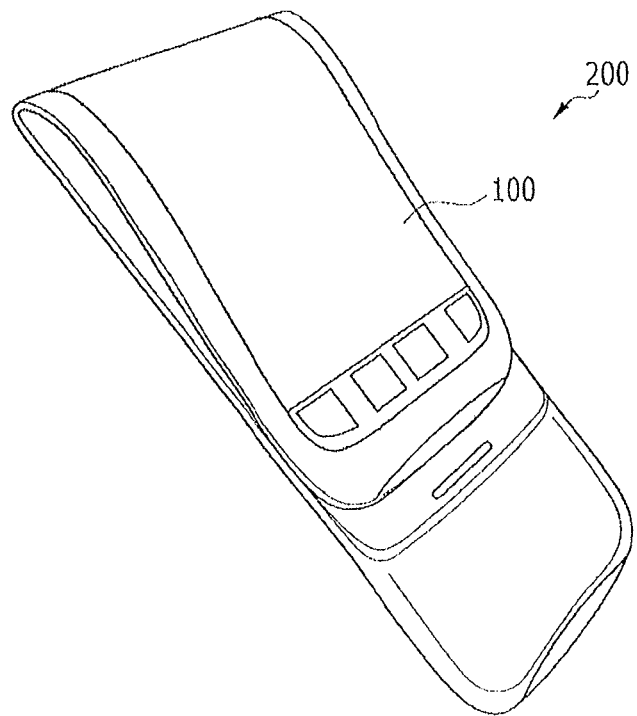
FIG. 7 illustrates a perspective view schematically of a flexible window according to an exemplary embodiment attached on a display panel unit.
Figure 8:
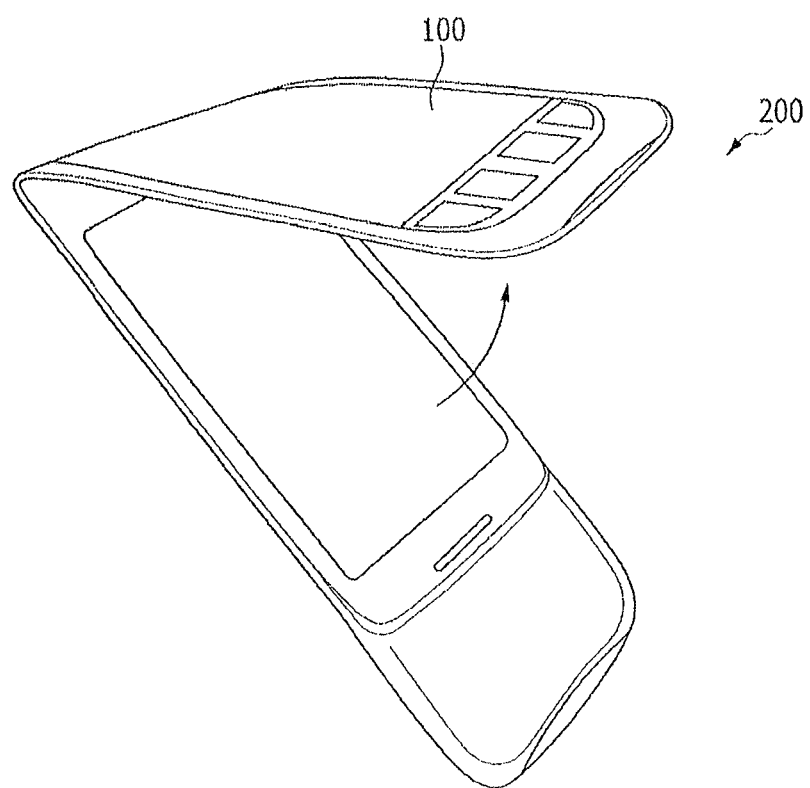
FIG. 8 illustrates a perspective view schematically of the display panel unit of FIG. 7 that has been unfolded.

FIG. 7 illustrates a perspective view schematically of a flexible window according to an exemplary embodiment attached on a display panel unit, and FIG. 8 illustrates a perspective view schematically of the display panel unit of FIG. 7 that has been unfolded.

As illustrated in FIGS. 7 and 8, when the display panel of the flexible display 200 is unfolded, it may be stably unfolded without a crack on the hard coating layer 20 by compensating for the curvature of the hard coating layer 20.

Figure 9:
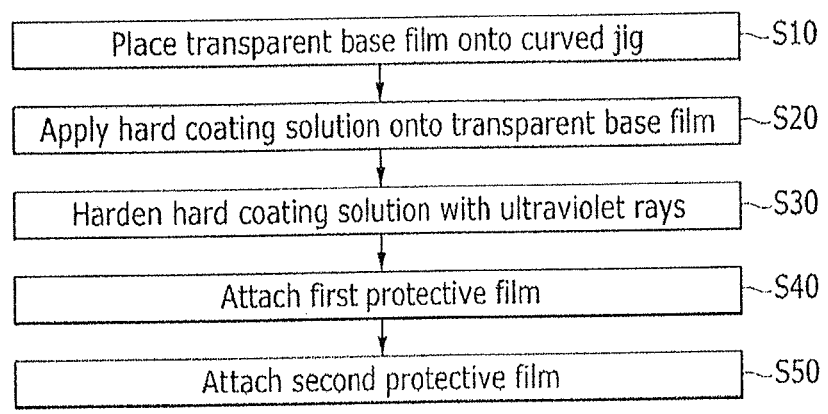
FIG. 9 illustrates a flowchart of a method of manufacturing a flexible window according to an exemplary embodiment.

FIG. 9 illustrates a flowchart of a method of manufacturing a flexible window according to an exemplary embodiment. The same reference numerals indicate the same components with the same functions throughout FIGS. 1 to 8. The components with the same reference numerals are not described hereafter. A method of manufacturing a flexible window is described hereafter in detail with reference to the drawings.

First, the transparent base film 10 is placed onto the curved jig 13 (S10). In S10, the curved jig 13 may have a rounded surface and may have a curvature R of 20. In the curved jig 13, the bottom is supplied on the floor of the work space and the side where the transparent base film 10 may be attached may be rounded.

Next, the hard coating solution 21 is applied onto the transparent base film 10 in S10 (S20). The hard coating solution 21 may include a composition for forming UV-curable hard coating layer and may be formed into the hard coating layer 20 by UV-curing.

Then, the hard coating layer 20 is formed by curing the hard coating solution 21 in S20 with ultraviolet rays (S30). The hard coating solution 21 is cured to have a curvature corresponding to the rounded portion of the curved jig 13 by ultraviolet rays in S30, and the hard coating solution 21 may become the hard coating layer.

The curvature R of the curved jig 13 may be 20 mm, the hard coating layer 20 may be formed to have a reverse curvature of 20 mm in S30, and even if the hard coating layer 20 is deformed in opposite direction to the flexible window deforming, the deformation may be compensated for by the reverse curvature R, and damage such as breaking may be prevented.

Next, the first protective film 30 is attached to the top of the hard coating layer (S40) and the second protective film 40 is attached to the bottom of the transparent base film 10 (S50). The first protective film 30 may be thicker than the second protective film 40.

The first protective film 30 may apply a tensile force opposite to the reversely curved direction of the hard coating layer 20, the flexible window 100 may be flat when the flexible window 100 is not attached to the display panel unit 11, and the flexible window 100 may be attached to the display panel unit 11 with reduced, minimal, or no difficulty.

By way of summation and review, a flexible display may be light, thin, and easy to carry. Such a flexible display may be achieved by using a flexible substrate such as plastic instead of glass.

A window with a hard coating layer on the part on which images may be displayed may be installed in the flexible display.

As the flexible display is repeatedly folded and unfolded, it is possible that the hard coating layer may crack and break.

Provided are a flexible window that may prevent a hard coating layer from being damaged even if the hard coating layer is deformed backward, and a method of manufacturing the flexible window.

According to an exemplary embodiment, a hard coating layer attached to a flexible window may have a reverse curvature, and when the flexible window is unfolded, damage to the hard coating layer such as cracks may not be generated, and durability may be improved.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of manufacturing a flexible window, the method comprising:
   placing a transparent base film onto a curved jig having a rounded surface;
   applying an uncured hard coating solution onto the transparent base film;
   forming a hard coating layer by curing the hard coating solution with ultraviolet rays; and
   attaching a first protective film having a first thickness to the hard coating layer and a second protective film having a second thickness less than the first thickness to the transparent base film, the first protective film applying a tensile force to the hard coating layer,
   wherein each of the transparent base film, the hard coating layer, the first protective film and the second protective film forms the flexible window.

2. The method as claimed in claim 1, wherein:
   the attaching the first protective film to the hard coating layer and the second protective film to the transparent base film comprises:
   attaching the first protective film onto a side of the hard coating layer opposite from a side thereof contacting the transparent base film; and
   attaching the second protective film onto a side of the transparent base film opposite from a side thereof to which the uncured hard coating solution is applied to form the hard coating layer.

3. The method as claimed in claim 2, wherein before attaching the first protective film and the second protective film, the transparent base film and the hard coating layer have a concave curvature.

4. The method as claimed in claim 2, wherein after attaching the first protective film and the second protective film, the flexible window has a flat shape.

5. The method as claimed in claim 1, wherein the curved jig has a radius of curvature of 20 mm at a surface where the transparent base film is placed.

6. The method as claimed in claim 5, wherein the hard coating layer has a same radius of curvature as the curved jig.

7. A method of manufacturing a flexible display device, the method comprising:
- preparing a display panel;
- preparing a flexible window having a transparent base film and a hard coating layer; and
- attaching the flexible window to the display panel,
- wherein preparing the flexible window includes:
  - placing a transparent base film onto a curved jig having a rounded surface;
  - applying an uncured hard coating solution onto the transparent base film;
  - forming a hard coating layer by curing the hard coating solution with ultraviolet rays; and
- attaching a first protective film having a first thickness to the hard coating layer and a second protective film having a second thickness less than the first thickness to the transparent base film, the first protective film applying a tensile force to the hard coating layer,
- wherein each of the transparent base film, the hard coating layer, the first protective film and the second protective film form the flexible window.

8. The method as claimed in claim 7, wherein the flexible window is attached to the display panel to face a concave portion of the hard coating layer to the display panel.

* * * * *